US010884910B2

(12) United States Patent
Buege

(10) Patent No.: US 10,884,910 B2
(45) Date of Patent: *Jan. 5, 2021

(54) METHOD TO CONFIGURE MONITORING THRESHOLDS USING OUTPUT OF LOAD OR RESOURCE LOADINGS

(71) Applicant: Spirent Communications, Inc., San Jose, CA (US)

(72) Inventor: Brian Buege, Dallas, TX (US)

(73) Assignee: Spirent Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/267,325

(22) Filed: Feb. 4, 2019

(65) Prior Publication Data
US 2019/0171554 A1    Jun. 6, 2019

Related U.S. Application Data

(63) Continuation of application No. 15/236,262, filed on Aug. 12, 2016, now Pat. No. 10,198,348.
(Continued)

(51) Int. Cl.
*G06F 11/00*    (2006.01)
*G06F 11/36*    (2006.01)
(Continued)

(52) U.S. Cl.
CPC ...... *G06F 11/3688* (2013.01); *G06F 11/0709* (2013.01); *G06F 11/0754* (2013.01);
(Continued)

(58) Field of Classification Search
CPC .......... G06F 11/3692; G06F 11/3688; G06F 11/3414; G06F 11/3495; G06F 11/3684
See application file for complete search history.

(56) References Cited

U.S. PATENT DOCUMENTS 6,078,953 A    6/2000 Vaid et al.
6,167,534 A    12/2000 Straathof et al.
(Continued)

OTHER PUBLICATIONS

U.S. Appl. No. 15/326,262—Office Acton dated Apr. 19, 2018, 12 pages.
(Continued)

*Primary Examiner* — Bryce P Bonzo
*Assistant Examiner* — Jeison C Arcos
(74) *Attorney, Agent, or Firm* — Haynes Beffel & Wolfeld LLP; Ernest J. Beffel, Jr.; Andrew L. Dunlap

(57) ABSTRACT

The technology disclosed enables the automatic definition of monitoring alerts for a web page across a plurality of variables such as server response time, server CPU load, network bandwidth utilization, response time from a measured client, network latency, server memory utilization, and the number of simultaneous sessions, amongst others. This is accomplished through the combination of load or resource loading and performance snapshots, where performance correlations allow for the alignment of operating variables. Performance data such as response time for the objects retrieved, number of hits per second, number of timeouts per sec, and errors per second can be recorded and reported. This allows for the automated ranking of tens of thousands of web pages, with an analysis of the web page assets that affect performance, and the automatic alignment of performance alerts by resource participation.

20 Claims, 14 Drawing Sheets

Related U.S. Application Data

(60) Provisional application No. 62/204,867, filed on Aug. 13, 2015.

(51) Int. Cl.
  *G06F 11/07* (2006.01)
  *G06F 11/34* (2006.01)
  *G06F 11/30* (2006.01)

(52) U.S. Cl.
  CPC ...... *G06F 11/3006* (2013.01); *G06F 11/3414* (2013.01); *G06F 11/3457* (2013.01); *G06F 11/3684* (2013.01)

(56) References Cited

U.S. PATENT DOCUMENTS

| | | | |
|---|---|---|---|
| 6,240,458 B1 | 5/2001 | Gilbertson | |
| 6,519,714 B1 | 2/2003 | Sweet et al. | |
| 6,530,065 B1 | 3/2003 | McDonald et al. | |
| 6,823,380 B1 | 11/2004 | Nace et al. | |
| 6,892,236 B1 | 5/2005 | Conrad et al. | |
| 7,437,450 B1 | 10/2008 | Gore et al. | |
| 7,581,006 B1 | 8/2009 | Lara et al. | |
| 8,326,970 B2 | 12/2012 | Cherkasova et al. | |
| 8,977,739 B2 | 3/2015 | Troup | |
| 9,727,449 B2 | 8/2017 | Hermeto et al. | |
| 9,940,640 B2* | 4/2018 | Moran | G06Q 30/0244 |
| 10,621,075 B2 | 4/2020 | Buege | |
| 2002/0198984 A1 | 12/2002 | Goldstein et al. | |
| 2003/0051064 A1 | 3/2003 | Curtis | |
| 2003/0065986 A1 | 4/2003 | Fraenkel et al. | |
| 2003/0074606 A1 | 4/2003 | Boker | |
| 2003/0091165 A1 | 5/2003 | Bearden et al. | |
| 2003/0120464 A1 | 6/2003 | Taft et al. | |
| 2003/0233445 A1 | 12/2003 | Levy et al. | |
| 2004/0030747 A1 | 2/2004 | Oppermann | |
| 2004/0103189 A1 | 5/2004 | Cherkasova et al. | |
| 2004/0111727 A1 | 6/2004 | Schwarzbauer et al. | |
| 2005/0177613 A1 | 8/2005 | Dresden | |
| 2006/0047794 A1 | 3/2006 | Jezierski | |
| 2007/0078943 A1 | 4/2007 | Daniels et al. | |
| 2007/0169563 A1 | 7/2007 | Hohjo et al. | |
| 2008/0162690 A1 | 7/2008 | Karagounis | |
| 2008/0172581 A1 | 7/2008 | Glas et al. | |
| 2008/0320076 A1 | 12/2008 | Silvert | |
| 2009/0083390 A1 | 3/2009 | Abu-Ghazaleh et al. | |
| 2009/0119301 A1 | 5/2009 | Cherkasova et al. | |
| 2010/0088549 A1 | 4/2010 | Duffield et al. | |
| 2010/0153529 A1 | 6/2010 | Moser | |
| 2010/0281208 A1 | 11/2010 | Yang | |
| 2010/0333072 A1 | 12/2010 | Dulip et al. | |
| 2011/0015917 A1 | 1/2011 | Wang et al. | |
| 2011/0054878 A1 | 3/2011 | Zhang et al. | |
| 2011/0270975 A1* | 11/2011 | Troup | G06F 11/2294 709/224 |
| 2012/0137059 A1 | 5/2012 | Yang et al. | |
| 2012/0173870 A1 | 7/2012 | Reddy et al. | |
| 2012/0246310 A1 | 9/2012 | Broda et al. | |
| 2013/0198391 A1 | 8/2013 | Weissblum | |
| 2013/0226967 A1 | 8/2013 | Gross et al. | |
| 2013/0275585 A1 | 10/2013 | Santhanakrishnan et al. | |
| 2013/0282545 A1 | 10/2013 | Gounares et al. | |
| 2014/0019560 A1 | 1/2014 | Li et al. | |
| 2014/0019804 A1 | 1/2014 | Buege et al. | |
| 2014/0289418 A1 | 9/2014 | Cohen et al. | |
| 2014/0297850 A1 | 10/2014 | Duffield et al. | |
| 2015/0120914 A1 | 4/2015 | Wada et al. | |
| 2016/0034381 A1 | 2/2016 | Keret et al. | |
| 2016/0147643 A1 | 5/2016 | Hamon | |
| 2016/0147645 A1* | 5/2016 | Kandpal | G06F 11/3672 717/124 |
| 2016/0191349 A1 | 6/2016 | Buege | |

OTHER PUBLICATIONS

Spirent Axon, "Spirent.RTM. Axon, Easy. Affordable Practical, brochure" 2013, Spirent Communications, Inc., 4 pages.

Spirent Axon, "Application Note—Testing Made Simple," 2014, Spirent Commuincations, Inc., <www.spirent.com>, pp. 1-18.

Spirent, "Support: Spirent Enterprise Customer Portal," 2014, Spirent Communications, Inc., <https://support.spirentforbusiness.com/support/home>, retrieved Oct. 11, 2014, 5 pages.

Spirent, "Enable the new Traffic Recorder (beta): Spirent Enterprise Customer Portal," Jun. 26, 2014, Spirent Communications, Inc., <https://support.spirentforbusiness.com/support/solutions/articles/100-0026580-enable-the-new-traffic-recorder>, Retrieved Oct. 12, 2014, 1 page.

Spirent, "How to enable the NetFlow probe: Spirent Enterprise Customer Portal," Apr. 2, 2014, Spirent communications, Inc., <https://support.spirentforbusiness.com/support/solutions/articles/100-0020325-how-to-enable-the-netflow>, RetrievedOct. 12, 2014, 2 pages.

Spirent, "Test Reference—Network Infrastructure Tests," Jun. 26, 2014, Spirent Communications, Inc.,<https://support.spirentforbusiness.com/support/solutions/articles/1000009746-test> Retrieves, Oct. 11, 2014, 17 pages.

U.S. Appl. No. 14/586,180—Office Action dated Oct. 6, 2017, 16 pages.

U.S. Appl. No. 14/586,180—Response to Office Action dated Oct. 6, 2017, filed Dec. 27, 2017, 14 pages.

U.S. Appl. No. 14/586,180—Office Action dated May 18, 2018, 13 pages.

U.S. Appl. No. 14/587,997 Non-final Office Action dated Aug. 25, 2016, 22 pages.

U.S. Appl. No. 14/587,997 Response to Non-final Office Action dated Aug. 25, 2016, filed Dec. 27, 2016, 13 pages.

U.S. Appl. No. 14/587,997 Nortice of Allowance dated Mar. 30, 2017, 12 pages.

U.S. Appl. No. 15/326,262—Response to Office Acton dated Apr. 19, 2018, filed May 29, 2018, 14 pages.

U.S. Appl. No. 15/326,262—Notice of Allowance dated Sep. 25, 2018, 19 pages.

U.S. Appl. No. 14/586,180—Response to Office Action dated May 18, 2018, filed Jul. 13, 2018, 14 pages.

U.S. Appl. No. 14/586,180—Office Action dated Oct. 18, 2018, 14 pages.

U.S. Appl. No. 14/586,180—Response to Office Action dated Oct. 18, 2018, filed Jan. 25, 2019, 15 pages.

U.S. Appl. No. 14/586,180—Notice of Allowance dated Dec. 9, 2019, 10 pages.

U.S. Appl. No. 14/586,180—Final Office Action dated May 28, 2019, 15 pages.

U.S. Appl. No. 14/586,180—Response to Final Office Action dated May 28, 2019, filed Jul. 18, 2019, 25 pages.

U.S. Appl. No. 14/586,180—Supplemental Response to Final Office Action dated May 28, 2019, filed Sep. 24, 2019, 28 pages.

\* cited by examiner

METHOD TO CONFIGURE MONITORING THRESHOLDS USING OUTPUT OF LOAD OR RESOURCE LOADINGS

RELATED APPLICATIONS

This application is a continuation of U.S. application Ser. No. 15/236,262, titled "Method To Configure Monitoring Thresholds Using Output Of Load Or Resource Loadings" filed 12 Aug. 2016, which claims the benefit of U.S. Provisional Application No. 62/204,867, entitled "Method to Configure Monitoring Thresholds Using Output of Load or Resource Loadings", filed Aug. 13, 2015. The priority applications are hereby incorporated by reference for all purposes.

This application is related to U.S. application Ser. No. 14/586,180, entitled "Stress Testing and Monitoring" by Brian Buege, filed Dec. 30, 2014 and U.S. application Ser. No. 14/587,997, entitled "Conducting Performance Snapshots During Test and Using Feedback to Control Test Based on Customer Experience Parameters" by Guilherme Hermeto and Brian Buege, filed Dec. 31, 2014, now U.S. Pat. No. 9,727,449, issued 8 Aug. 2017, both of which applications are incorporated by reference herein.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

A web page can be made of tens or even hundreds of objects such as images, Cascading Style Sheets (CSS), JavaScript (JS) modules, Flash SWF players and objects, and the HTML code itself. These resources are typically identified by Uniform Resource Locators (URLs), Uniform Resource Identifiers (URI) or another standard-specified resource naming convention. The quantity, structure, and configuration of the resources request affect the load performance of a web page. Architectural issues such as compression, cache configurations, and Content Delivery Network (CDN) utilization also affect performance of a web page and resulting user experience.

There are a large number of servers, networking devices, network services such as DNS, and protocols between the consumer of the web page and the source of the web page and its constituent objects. These devices can be connected using media such as copper wire, fiber optics, and wireless technologies that span a large portion of the electromagnetic spectrum. Wireless technologies such as radio, microwave, infrared, Bluetooth, WiFi, WiMAX, and satellites all use the radio spectrum for digital communications. Each device, protocol, and transmission medium has its own operating characteristics, which are further complicated by distances measured in terms of latency. The characteristics of each of the many components of the system between and including the user web browser and the web page content servers can affect the overall user experience of access the web page. Thus, analyzing a user experience and improving it can be very complex.

SUMMARY

Thresholds allow a web site administrator to receive notifications when configured variables have exceeded, or are beginning to exceed, predetermined values that will adversely affect a user's experience. Configuration of thresholds applied to monitoring web sites involves the coordination of multiple variables such as number of users, server memory, network speed, network latency, and asset configuration. Historically, these thresholds have been set on a trial-and-error basis. The technology disclosed provides a method and system where identifying the threshold point for one variable can automatically set a threshold point for other variables.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

DETAILED DESCRIPTION

Figure 1A:
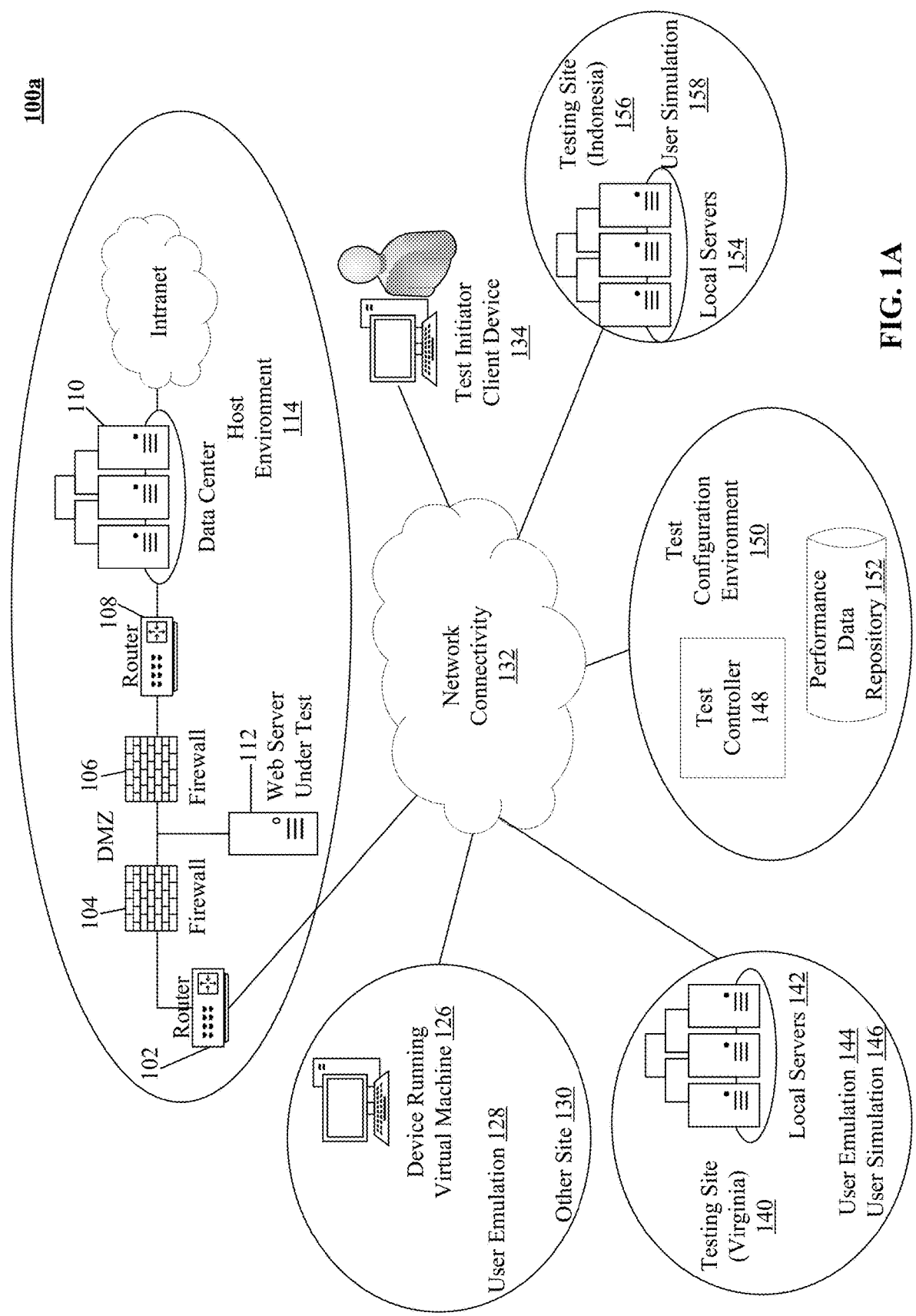
FIG. 1A is a diagram illustrating a test network.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Content delivery and customer self-service span borders. Data is delivered across continents around the clock in at least 20 time zones. Success or failure can be measured by user experience, wherever the user is in the world. Distributed data centers are intended to reduce latency, but the supporting infrastructure varies wildly around the globe.

Slow communications that compromise user experience are endemic to regions that rely on satellite links, because of both network capacity and distance travelled by a signal that bounces off a satellite. Sluggish page loads associated with high latencies are stressful to servers, keeping a server engaged with a single page load many times as long as it would be engaged on a low latency channel. A small number of distant users can tax a system more than a much larger number of users close to a CDN provider.

Content consumed by a single web app is delivered from multiple sources, sometimes dozens of root domains. Throughout this application, we refer to a web app to be inclusive of both a web application that runs on a browser-like light client and to a web page that is accessed using a browser. Apps running on smart phones, tablets and netbooks that depend on content retrieved via the web from an app server are included among web apps. Resources consumed by a web app can, for instance, come from a data center, a memcache, a content delivery network (CDN) and an ad network. For instance, authentication and personalization can be handled by a data center, cascading style sheets (CSS code) fetched from a memcache, and product illustrations or videos supplied by the CDN. The matrix of potential request and resource locations complicates test scenarios and tests.

The technology disclosed supports the automatic setting of thresholds used to monitor load and response time, across operating variables including number of simultaneous sessions, server CPU load, server memory utilization, network bandwidth utilization, network latency, server response time, and load time experienced by a client. Automatic setting or recommendation of alert thresholds is accomplished by mixing traffic simulation that generates bulk resource request loads with web app emulation that emulates the sequence of web app resource requests and produces a realistic evaluation of user experience. Bulk resource request traffic simulation can be performed by a state machine or a script without rendering the returned resources in a browser and without following web app resource loading sequences or dependencies. Any resource used by a web app can be stressed by simulated resource requests. Over-provisioned resources can ignored, as load simulation does not depend on how a browser loads a web page. Browser or application emulation, in contrast, emulates resource loading dependencies and evaluates user experience. More resources are needed to emulate web app resource loading than to simulate bulk request traffic. The test technology disclosed simulates most of the load and emulates a few, preferably a statistically significant number of web app resource loading sequences. As the volume of simulated traffic ramps up, the number of emulated page loads can remain relatively level, consistent with a sampling plan.

The mix of bulk request simulation and resource loading emulation can be used to set notification or alarm thresholds for system monitoring. Visualizations of emulated resource loading results allow a system administrator to pinpoint conditions that precipitate or at least precede deterioration of user experience. The test system can explore resource load patterns that degrade user experience and deliver visualizations of test results. Simulated load components can be increased to degrade load time beyond a limit and then rerun with finer granularity close to the limit to present a clear picture of how load impacts performance. A so-called elbow or knee in a response graph can readily be seen by the system administrator. User controls embedded in a visualization can enable a system administrator to select a performance discontinuity and set a notification threshold accordingly. The system can find a variety of correlated factors and automatically set or recommend additional, correlated thresholds, supplementing the factor visualized and used by the administrator to set one threshold. For instance, a visualization of cascading spreadsheet (CSS) resource load times can be closely correlated with memcache utilization, selection of a response time threshold can be complemented, automatically, by setting or recommending a memcache-related threshold. In some implementations, the user can specify a maximum web resource loading time and the system can respond by setting or recommending thresholds, selecting visualizations for administrator evaluation or both.

INTRODUCTION

A user's experience with a web page is highly dependent on attributes such as initial service response times, server CPU utilization, available server memory, network bandwidth, hit rates, error rates, total number of users, and network latency. These attributes and others are affected by the overall content of the web page such as images, JavaScript code, stylesheets, database access for dynamic content, etc., as each piece of content requires time and effort for its retrieval and display. An operator of a web page can set monitoring thresholds for each of these attributes so that alerts or excessive reading levels are generated when a monitored system operating parameter reaches a level where a user's experience is impacted or about to be impacted.

FIG. 1 is a diagram illustrating a test network, according to one implementation. The test network hosts a hybrid test environment that runs two different kinds of test concurrently: bulk load simulation, sometimes referred to as a load or performance test, and user emulation, which we refer to as a performance snapshot.

The word "simulation" is used to connote reproducing an aspect of load behavior for testing that is a portion of what would be done by actual users. For example, bulk load simulation generates resource requests for one of twenty URLs, without processing the contents of the responses. Or, the load can be a first URL, then a second URL immediately upon completion of loading the first URL, without rendering the content of the first response. The second URL can be one that is embedded in the first response and the test can be scripted to consistently request the second URL without needing to parse contents of the first response. Thus, simulation can run from a state machine with limited content parsing.

The word "emulation" is used to connote running a test that approximates actual web app resource use. For example, user emulation uses an instrumented web browser that automatically requests and loads an entire web page in the same sequence that a browser would do at the command of a user. It may parse and render the content loaded. The performance observed during user emulation measures a user experience under simulated loads. User emulation on one session can evaluate the impact of a thousand or million simulated request sessions. Preferably, a statistically significant number of user emulations are conducted, though an arbitrary number of emulations such as 100, 500, 1,000 or 10,000 emulations, or a range between any two of those numbers or exceeding any one of those numbers, can be used. User emulation resource consumption for a few users, contrasted with load simulation of many users, is modest enough that an arbitrary number of emulations can satisfy a rule of thumb without resort to more complex criteria such as statistical significance. The number of emulations can be a total, across all test conditions, or a number applied to each discrete test condition. The emulations can be conducted sequentially or in parallel. For instance, 10, 50, 100 or 500 emulation sessions can run STET, or a range between any two of those numbers or exceeding any one of those numbers, can be used.

The example network illustrated in FIG. 1A shows a sample Host Environment 114 site at the top of the page where a web server under test 112 resides. The web server under test 114 is sometimes referred to as a system under test ("SUT"). It can be co-located with the data center 110. The user experience of requesting and loading a web page served by web server 112 can be measured under a simulated load. The simulated load can exercise single or multiple resource providers by creating a load of requests for selected objects on a web page or objects provided by the same back end system. For example, if a database response object is computed based on data stored in a backend database in data center 110, the time required to compute the object can depend on delays introduced by the database server and delays caused by the interconnecting with a network. The response time for retrieving objects stored locally on the web server under test 112 and the time for computing database response objects, will both vary under loads.

The diverse origin locations of resource requests also can be tested. Simulated load components and emulated sessions can be carried over different network segments and, consequently, subjected to different latencies and communication error rates. Network connectivity 132 is further discussed below with reference to FIG. 1B.

The example host environment 114 illustrates potential complexity of the test environment and some the factors influencing performance of a web server under test 112. The network segment between firewalls 104 and 106 provides a so-called Demilitarized Zone (DMZ). The web server under test 112 can be located in the DMZ. A router 108 can connect the DMZ to a data center 110 where content servers and web servers can be hosted. The web server under test 112 can host a web page having references to web objects that are provided from inside the data center 110 and elsewhere. Requests for a tested web page that is hosted by the web server 112 can arrive over a network 132 from remote sites. Requests for web objects hosted in the data center 110 can similarly arrive from remote sites, as bulk request load(s) during a test. In other examples of a host environment 114, routers and/or firewalls can be combined into one device, or implemented in software and not require a separate physical device. In addition, the web server under test 112 can reside in a host environment 114 that does not include a full datacenter or an intranet.

Another site illustrated in FIG. 1A is the Test Configuration Environment 150 that includes at least one workstation or server for generating and/or serving a test configuration interface that allows a user to create a test plan. The test configuration environment 150 sends instructions to other sites to initiate the test plan. In one implementation, a user using a test initiator client device 134 accesses the test configuration environment 150 through network connectivity 132, configures a test, and generates a test plan. In this example, test initiator client device 134 can include a web browser, and the test configuration environment 150 can be a web-based interface. In another embodiment, the test initiator client device 134 can be a standalone application or local application running in a browser.

A test controller 148 in the test configuration environment 150 can distribute the test plans to each site for which users will be simulated and/or emulated. The test controller 148 also receives performance data back from these sites and stores the performance data in the performance data repository 152. User output, including reports and graphs, are produced using the test results data stored in the performance data repository 152.

One or more testing sites 140, 156 can be installed at different geographic locations. The test sites receive a test plan from the test controller 148 and execute the test plan, by simulating load and emulating page requests from a specified number of users. The load can be directed to a particular resource or to multiple resources. A script, state machine parameters, or other procedural or declarative program instructions can specify details of load generation. The emulated page requests are directed to a certain URL from the web server under test 112, followed by requests for resources identified on page(s) returned. For example, testing site 140 can reside in Virginia, and the local servers 142 can receive the test plan and simulate load from a requested number of users in Virginia (e.g., 5,000) and can emulate resource requests from a smaller number of users (e.g., 10) to the host environment 114. Another testing site 156 can be located in Indonesia with simulated load and emulated resource requests physically originating from Indonesia. Pre-established sites such as Virginia 140 and Indonesia 156 can include one or more local servers 142 and 154 respectively with test software installed that receives and executes a test plan sent by the test controller 148. Cloud computing resources can be used to provision simulation and emulation at these sites and other sites, using a tool such as Spirent's Blitz testing platform. Test configuration environment 150 can also serve as a testing site, though that is not required.

The software installed on the one or more local servers 142, 154 in a testing site can run in a virtual machine that can be provisioned on a server in a selected location. For example, Other Site 130 can be a server provided by a cloud resource provider such as Amazon EC2, Google Compute Engine (GCE), Microsoft Azure, Rackspace or the like. If the Other Site 130 needs to be provisioned for testing purposes, a computer device 126 at the Other Site 130 can install and run a virtual machine that can receive and execute the test plan. Thus, a site not previously configured as testing site can be selected and configured on the fly as a testing site.

The test initiator client device 134 and its operator can be located anywhere that has network connectivity to the test configuration environment 150. Thus, the test initiator 134, test controller 148, and performance data repository 152 can be located within the Host Environment 114, within the test configuration environment 150, within any pre-established testing site or within another site selected on the fly.

An instrumented web browser can perform user emulation, retrieving a web page and collecting performance data for receiving a response and loading various objects on the page. The web browser emulators can be located in any of the environments shown in the test network 100. Web browser emulators used for user emulation 128 and 144 are illustrated as running in the Virginia testing site 140 and the other site 130 respectively. Thus, a browser emulator can be co-located with a testing site that conducts user load simulation.

Figure 1B:
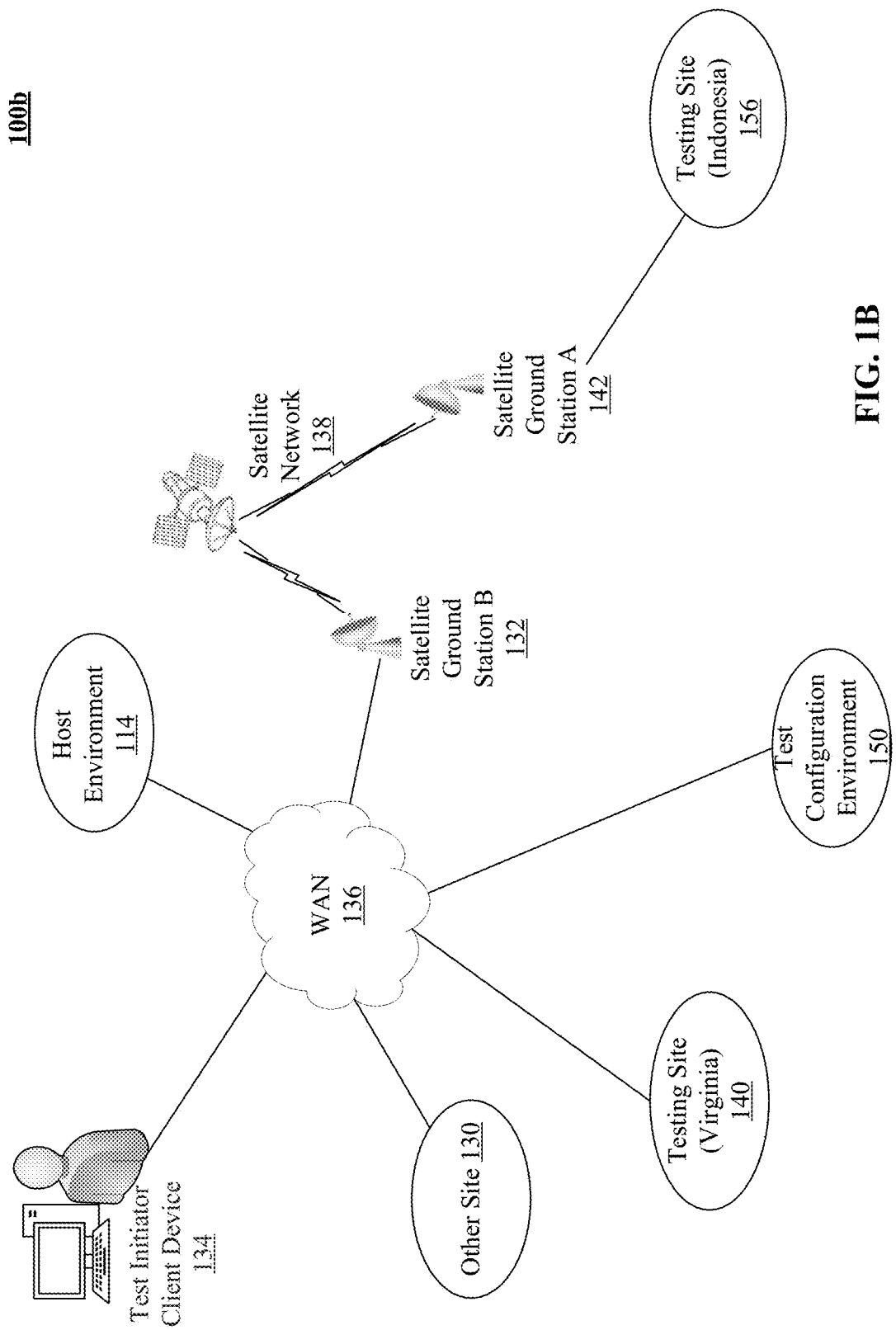
FIG. 1B is a diagram illustrating network connectivity among sites depicted in FIG. 1A.

FIG. 1B is a diagram illustrating network connectivity among sites. In one implementation, computing and network devices within a site can be connected via a local area network (LAN). A site can connect into a wide area network (WAN) 136. For example, local sites 130 and 140, test configuration environment 150, host environment 114 and test initiator client device 134 connect through WAN 136. The Indonesia testing site 156 can connect first to a satellite ground station A 142, which connects to a satellite network 138, which then connects to a satellite ground station B 132, which then connects to the WAN 136. Thus, traffic generated from the testing site in Virginia 140 can travel less distance to arrive at the server under test 112 than traffic generated from the Indonesia local site that has to traverse a satellite network in addition to the WAN to reach the server under test 112.

Figure 2:
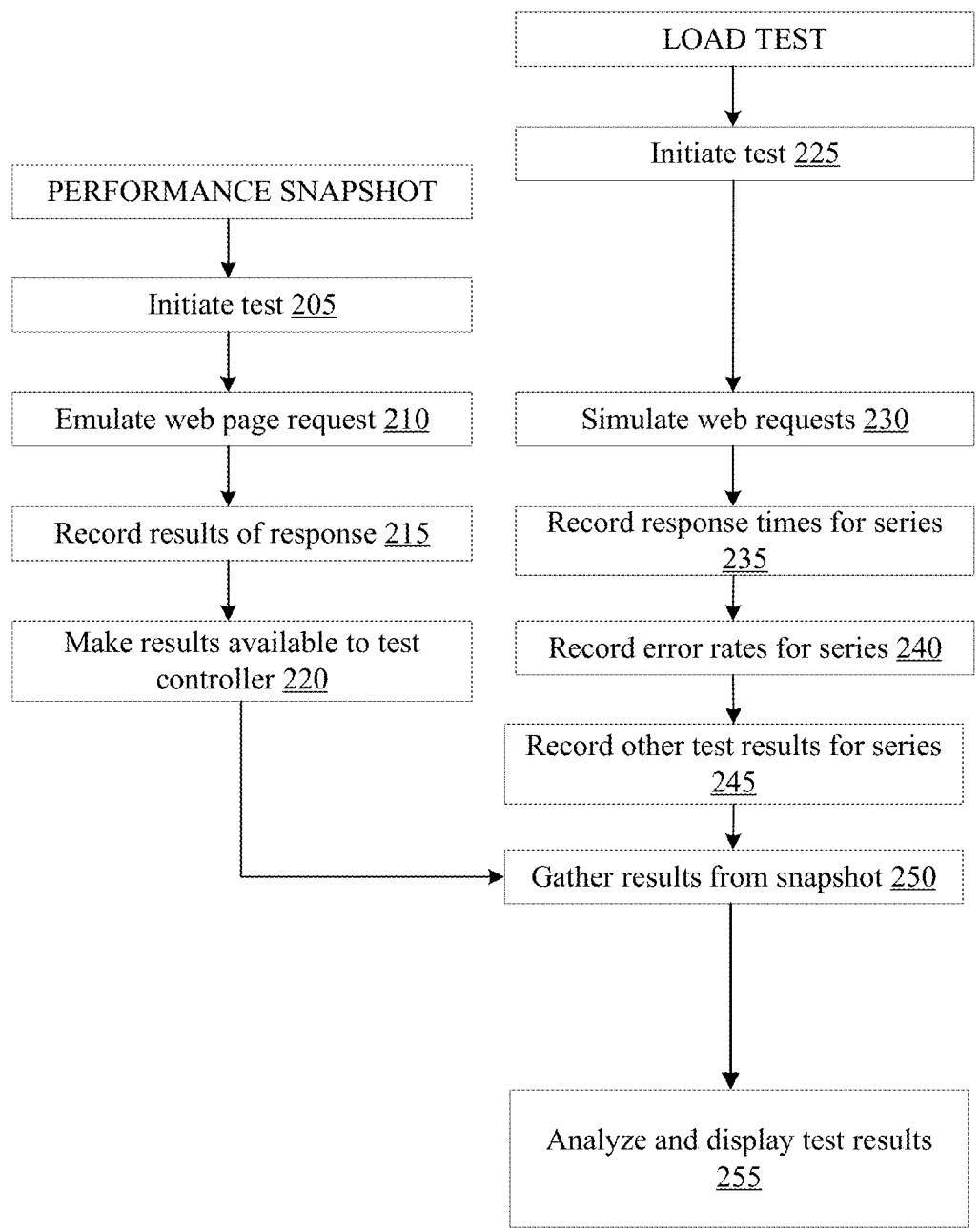
FIG. 2 is a flow chart illustrating a process for performing a performance snapshot during a load test.

FIG. 2 is a flow chart illustrating a process for performing resource loading or user load simulation while collecting performance snapshots by web app or browser emulation. The two branches of the flowchart are coordinated so that performance is measured under load and various loads can be correlated by their impact on systems. The illustrated flow can be implemented in the environment depicted by FIG. 1, e.g., a web server under test that is subject to simulated loads and emulated browser sessions from multiple sites 130, 140, 156, connected by a network 132. Other implementations may perform the actions in different orders and/or with different, fewer or additional actions than those illustrated in FIG. 2. Multiple actions can be combined in some implementations. For convenience, this flowchart is described with reference to the system environment in which the method is useful. The method can apply to a variety of computer systems.

Prior to the flows illustrated in FIG. 2, the test controller 148 delivers test plans to participating sites 130, 140, 156. Parts of the test plan can be cached, installed or configured at the participating sites and invoked according to the test plan.

FIG. 2 illustrates an example test initiated by a test controller, including a simulated load test 225 and emulated web app or browser sessions 205 that report performance snapshots. The test implements the test plan.

In Step 230, resource requests, which may be web page, URL or URI requests, are generated to correspond to a selected number of simulated users in selected regions. These requests place a traffic load on the web server under test 112 or another component involved in responding to resource requests. That is, given the structure of a web page or app resource profile, load may be applied to providers of resources invoked from the web page being tested. The load impacts intervening network segments and backend services that respond to requests. Each simulated resource request can access at least one retrievable object or asset. For example, a request can be direct to an .html, .css, .htc, .js, .gif, .jpg, .png, .avi, .mpeg, or QuickTime file accessed through a URL. A resource request directed to a URL can cause execution of a server-side application or script to generate or retrieve custom content in real time, as an alternative to retrieving pre-stored content.

Steps 235 and 240 respectively record the response times and error rates for response to the simulated load. In Step 245, other test results such as example hit rates and timeouts are recorded.

The performance snapshot flow begins in Step 205. Performance snapshots are timed relative to the load created by the performance test. The emulated browser or app requests a web page or similar resource in Step 210 and subsequently requests the resources or assets referenced in a web page and its child documents. In some implementations, the structure of a web page can be pre-analyzed and scripted for consistent testing, with dependencies identified.

Performance of the emulated web page or app resource retrieval and processing are recorded in step 215, and the results are made available to a test controller in step 220. The system gathers and summarizes this performance data in Step 250 as a performance snapshot. In Step 255, the load test timing and results are correlated and prepared for display. In one implementation, performance and snapshot data can be stored in the Performance Data Repository 152. The test controller 148 can retrieve, analyze and present the data as test results.

Rush Test Configuration

Figure 3:
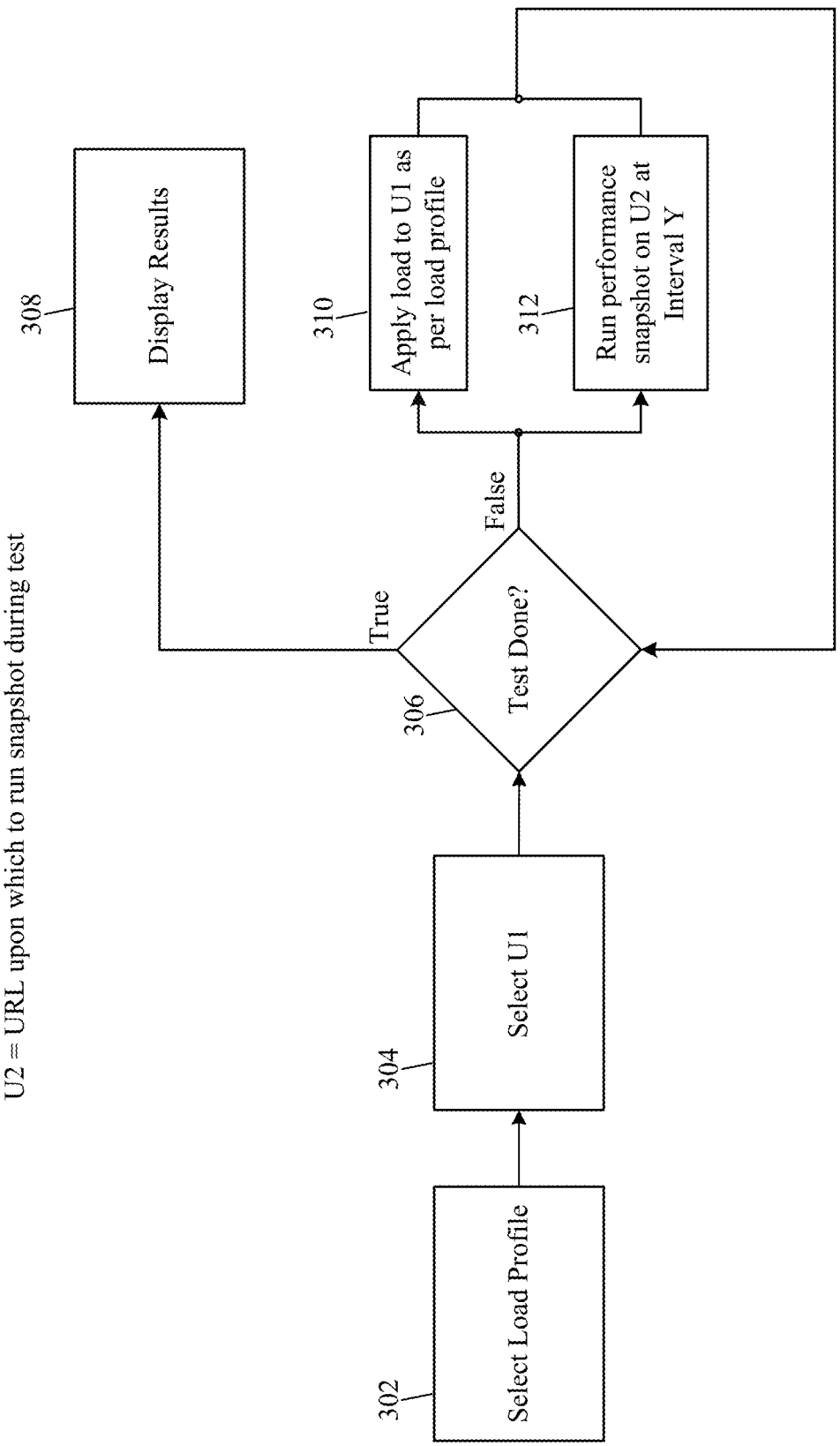
FIG. 3 is an example process that varies the simulated request load.

The process described in FIG. 2 can be implemented according to a variety of test plans. For example, FIG. 3 is an example process that varies the simulated request load 230 for at least one URL to represent a range in the number of users, while running performance snapshots 312. In this example, the test initiator 134 selects a load profile 302 to be used for the test, which identifies configuration settings for the test. The load profile 302 can include at least one target URL 304 or it can leave the selection of resources to load test to the system to explore systematically. Once the test begins 306, the system increases the load as indicated in the load profile 310, while running performance snapshots at a predetermined interval 312 or when triggered by a load testing or other script. Once the load profile 302 has completed its execution, the results 308 are available for storage, analysis, and display.

Figure 4:
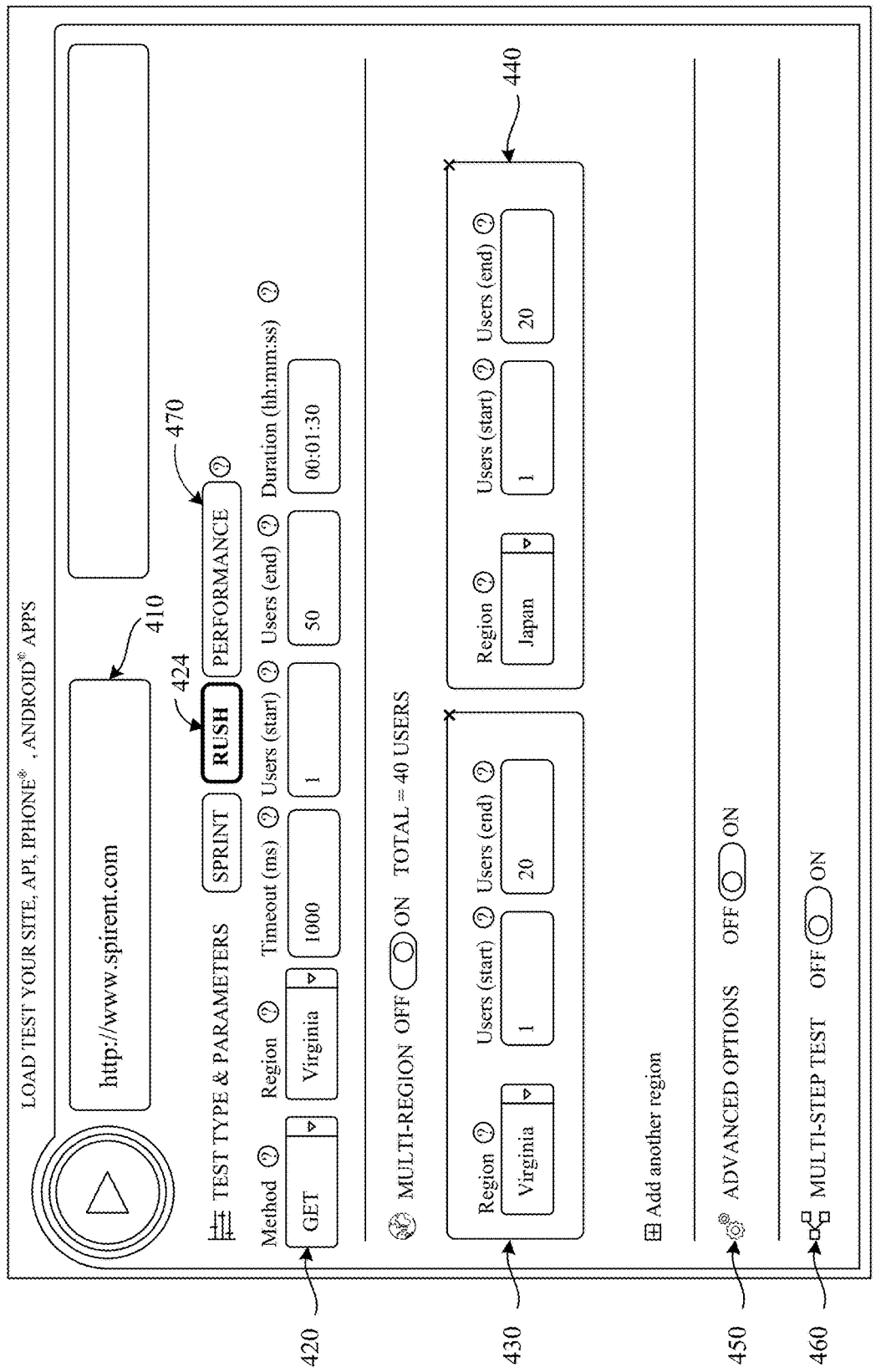
FIG. 4 is an example interface for configuring a so-called rush test of resource request loading.

FIG. 4 is an example interface for configuring a so-called rush test of resource request loading. This test can be accessed via the RUSH tab 424. A rush test 424 increases the request load past a point of performance deterioration and then increases the load more slowly in an automatically or manually determined load range that brackets the point of performance deterioration. Test configuration interface 400 allows a user to configure the performance tests to place a load on the web server under test 112 while running the emulated browser. The URL to test appears in text field 410 and is editable. Test types and parameters 420 allows configuration of the HTTP method applied during the test (e.g., GET, POST, OPTIONS, HEAD, PUT, DELETE, TRACE, CONNECT, PATCH), the region from which the test is performed, how long to wait for a response before timing out (e.g. 1000 ms), and how long to continue running the test. For example, a test can be configured, as illustrated, to include serial GET requests from 40 client-requestors and to last one minute and 30 seconds.

Multi-region configuration allows specifying regions and the number of client-requestors to simulate per region, both at the start of the test and at the end. During the test, the number of client-requestors increases. At the beginning of the test, only one client-requestor in each region 430, 440 is simulated (two total). At the end of the test, twenty client-requestors are simulated in each region (forty total). For example, the region Virginia 430 starts with one client-requestor and ends with 20 client-requestors requesting the page. The test for each simulated user includes serial requests for at least some components of URL 410, as described above. This test lasts only one minute, 30 seconds. Similarly, the region Japan 440 begins the test with one and ends 20 simultaneous simulated client-requestors issuing GET commands for at least one URL 410 from hardware located in Japan. More regions can be added to the test as required.

The Advanced Options 450 portion of the user interface allows configuring parameters for the HTTP request that is sent when running the test. The advanced options feature can allow setting the user-agent, cookie, or data to include in a PUT or POST request. Authentication information and SSL version to use are other examples of HTTP parameters that can be specified through advanced options. In addition, the one or more HTTP status codes that are to be considered as successful results (i.e. counted as a "hit") and the amount of time to wait for a response and load completion before timing out are examples of test environment parameters that may be set with advanced options.

The multi-step test 460 interface allows configuring a simulated load that includes a sequence of HTTP operations, such as a sequence of requests. For example, if the user experience metric of interest is the time to load images, a multistep test might be configured to request a sequence of image URL, after retrieving the main web page (or without retrieving the page).

Emulation Test Configuration

Multiple browser emulation snapshots can be collected concurrently. Physical locations of emulated browsers can be configured. The Performance Tab 470 (not detailed) provides an interface for configuration of performance snapshots. For instance, the primary URL of web app resources to retrieve, the number and location of emulators, and the time interval for taking snapshots are all configurable. Output options, such as displaying a Program Evaluation Review Technique (PERT) chart or Waterfall diagram are configurable, as is the sampling frequency, typically in number of times per second to launch browser emulations.

Emulation Test Results

Figure 5:
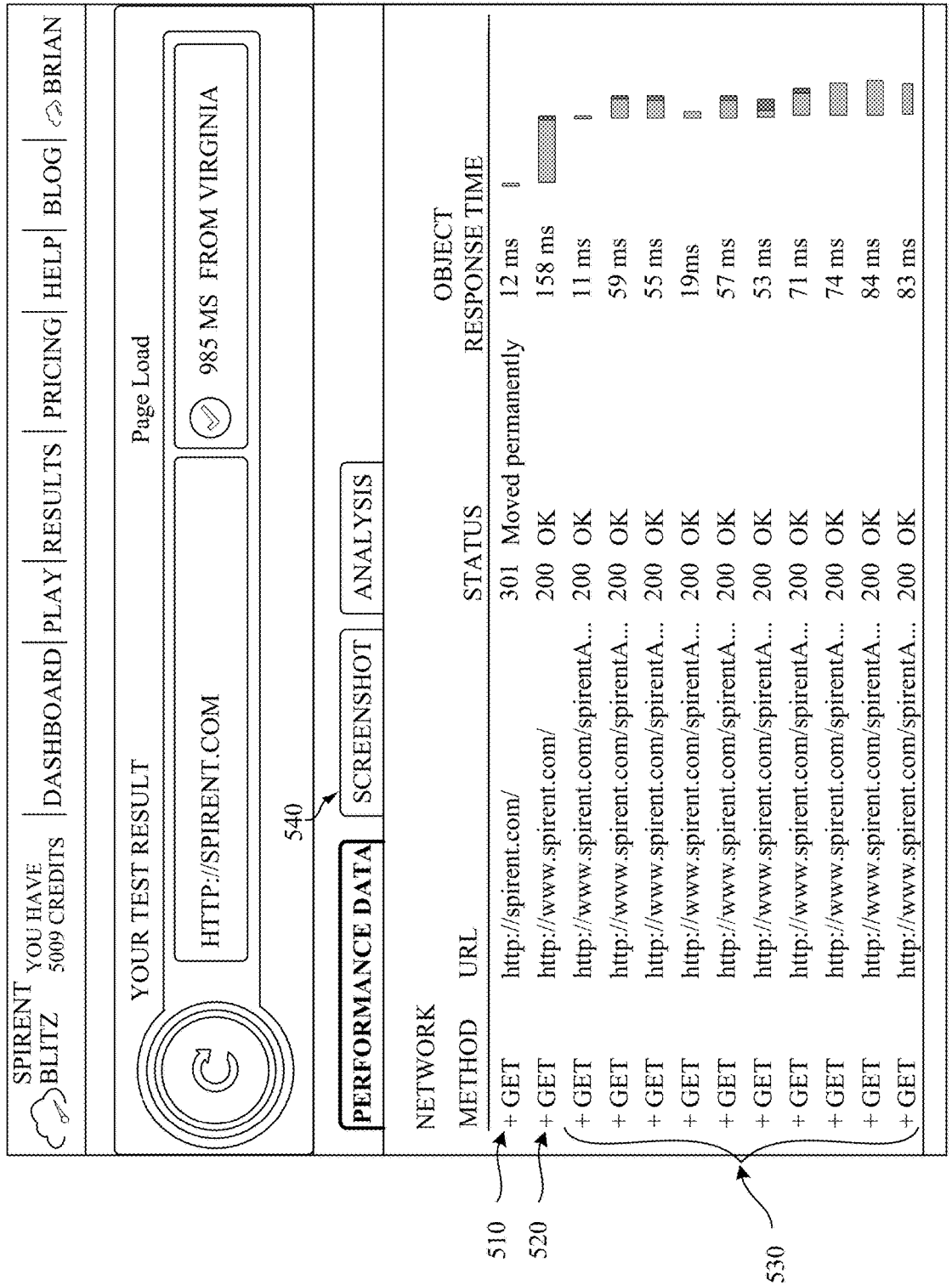
FIG. 5 is a sample GUI of a performance snapshot waterfall, also known as a cascaded bar chart, with milestone indicators.

FIG. 5 is a sample GUI of a performance snapshot waterfall, also known as a cascaded bar chart, with milestone indicators. In this example, the data in the screen shot was generated by emulating at least one browser running on hardware located in Virginia and sending GET requests for a Spirent home page and its component objects. The total resource loading time for loading, parsing and pseudo-rendering the web page was 985 ms. The Performance Data tab of the test results is displayed. The browser issued GET requests to retrieve resources, which are individually listed along with the response status for loading the resources.

This example traces requests that follow from an initial request for the bare root URL //spirent.com 510, which took 12 ms to receive a response from a resolver. The response was a "301" HTML status code and redirection, indicating that the page was moved permanently from spirent.com to www.spirent.com. Requesting the redirected page, //www.spirent.com 520, took 158 ms to complete and was successful (Status 200). The object response time 520 includes both initial response time and object load time. The shading difference in the body of the response time bar indicates that most of the overall response time was initial response time. The initial response included numerous embedded references 530 to other resources or objects. The emulator parsed the initial response (or worked from a pre-parsed version of the initial response, for repeatability) and issued GET requests 530 to retrieve the objects referenced by the page returned from //www.spirent.com. The GUI 530 shows status and object response time of the GET requests. Numerous GET requests were launched more or less simultaneously. The object response time bar indicates the object response time, displayed in two parts as appropriate. Again, the left part of the bar indicates the time to receive the beginning of the response (i.e., the initial response time.) The right part of the bar indicates the resource or object load time, from the beginning of the response to completion of loading the object. The first and second parts of the bar can be displayed in contrasting colors or patterns. The overall length of the bars represents the total resource loading time. Many objects are shown as having been loaded concurrently.

The screenshot tab 540, which is not displayed in the figure, depicts the state of the web page under test at chosen stages of load. For example, suppose GETs 2 through 6 of 530 are CSS files. These 5 GETs can be selected as a group, and the screenshot tab 540 would show the state of the web page at the point where these 5 GETs had been loaded, but subsequent objects had not.

Figure 6:
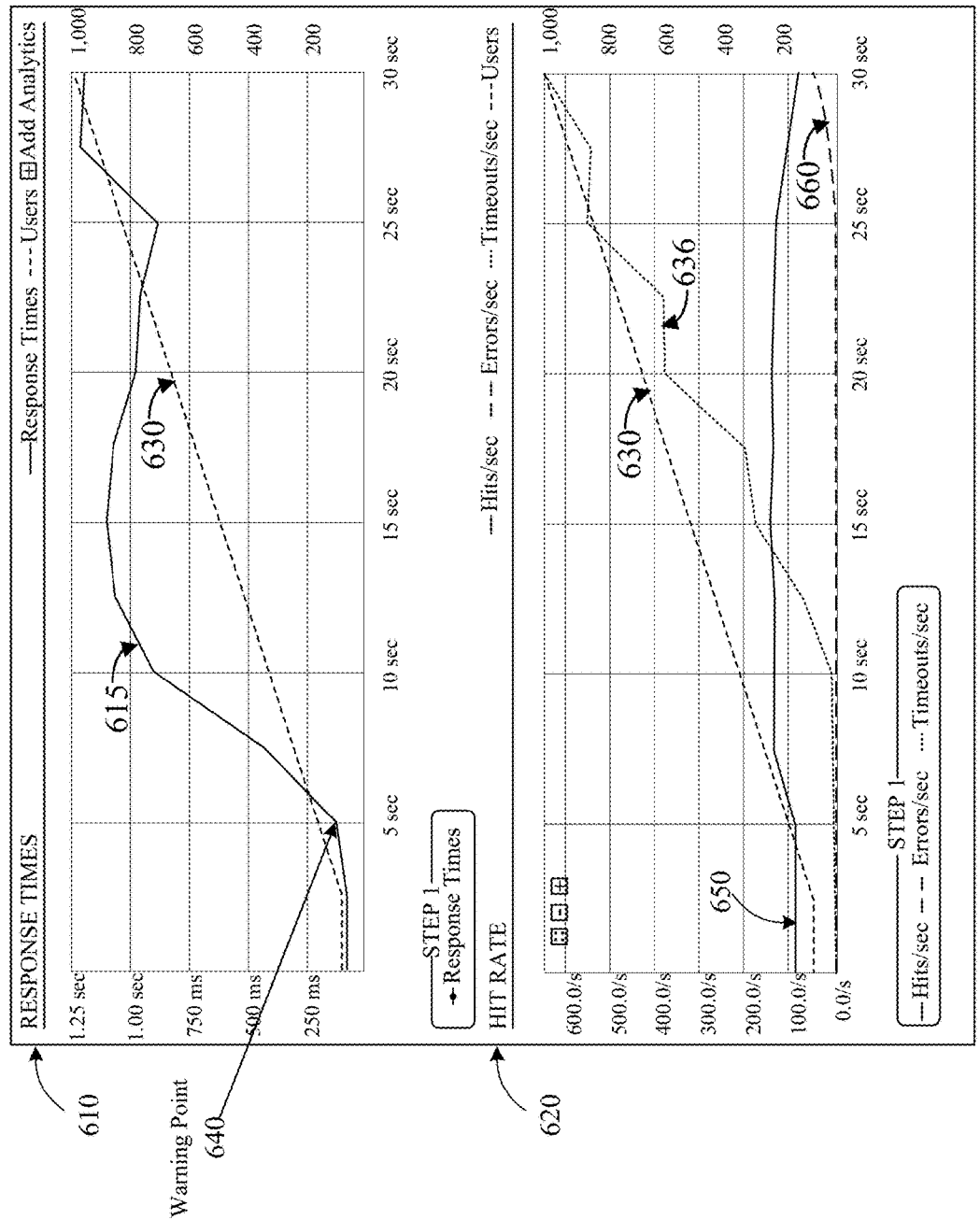
FIG. 6 illustrates graphs of response times and hit rates for an example rush test.

FIG. 6 illustrates graphs of response times (610) and hit rates (620) for an example rush test. Each graph has two vertical axes, with the right hand vertical axis and the long dashed line 630 indicating the size of user load over the duration of the test, beginning with 100 simulated users, running level for about 3 seconds, increasing steadily and ending with 1000 simulated users at 30 seconds. In the top response time graph 610, average response time is reported by line 615. In the bottom hit rate graph 620, line 650 represents the average hit rate per second. Line 636 represents timeouts per second for the test, which rises from about zero at 10 seconds and 400 users to 600 timeouts per second at 30 seconds with 1000 users. Line 660 represents an error rate in errors second.

In the top graph 610, an example warning point 640 is set at the elbow/knee, where the response time take a clear turn for the worse. This knee at about 5 seconds into the test indicates that response times increase dramatically when the system reaches about 170 users. A threshold generated by testing can be used to configure subsequent monitoring system to take specified actions when a warning point threshold is met.

In the bottom graph 620, a second elbow appears when time outs begin to occur, about 10 seconds into the test with about 400 simultaneous users. The successful hit rate 650 tops out about 7.5 seconds in with approximately 300 users. About 150 successful hits per second are handled until 25 seconds, when errors begin and successful hits diminish. These performance results can indicate that when the system receives requests from 200 concurrent users, the user experience is in danger of being adversely impacted. At 300 or 400 concurrent users, the system begins to time out instead of experiencing an increased hit rate. A second and third warning point can be set at these numbers of user.

This performance result information can be used to configure a monitoring system for operational use. A user clicking at the warning point 640 in graph 610 can configure an alerts for when concurrent user sessions exceeds 170 and, correspondingly, when response times exceed 150 ms. Clicking on graph 620 can produce alerts when successful hits per second exceed 190, when errors begin (more than 1 per second), and when timeouts exceed 5 per second. Not illustrated in the figures, but also available in graphs are system measures such as server CPU load, server memory utilization, network bandwidth utilization, network latency, server response time, and response time from a particular location. Alerts based on these metrics can be set automatically or manually based on their operating levels at the time when the number of concurrent users reaches warning point 640. Or, the other metrics can be individually analyzed to understand system sensitivity and set thresholds accordingly. These alerts, and others, can be stored on the web server under test 112. While we refer to configuring alerts, other types of graphics such as thermometers, dials or traffic lights can be configured so that multiple measures are viewed simultaneously.

Figure 7:
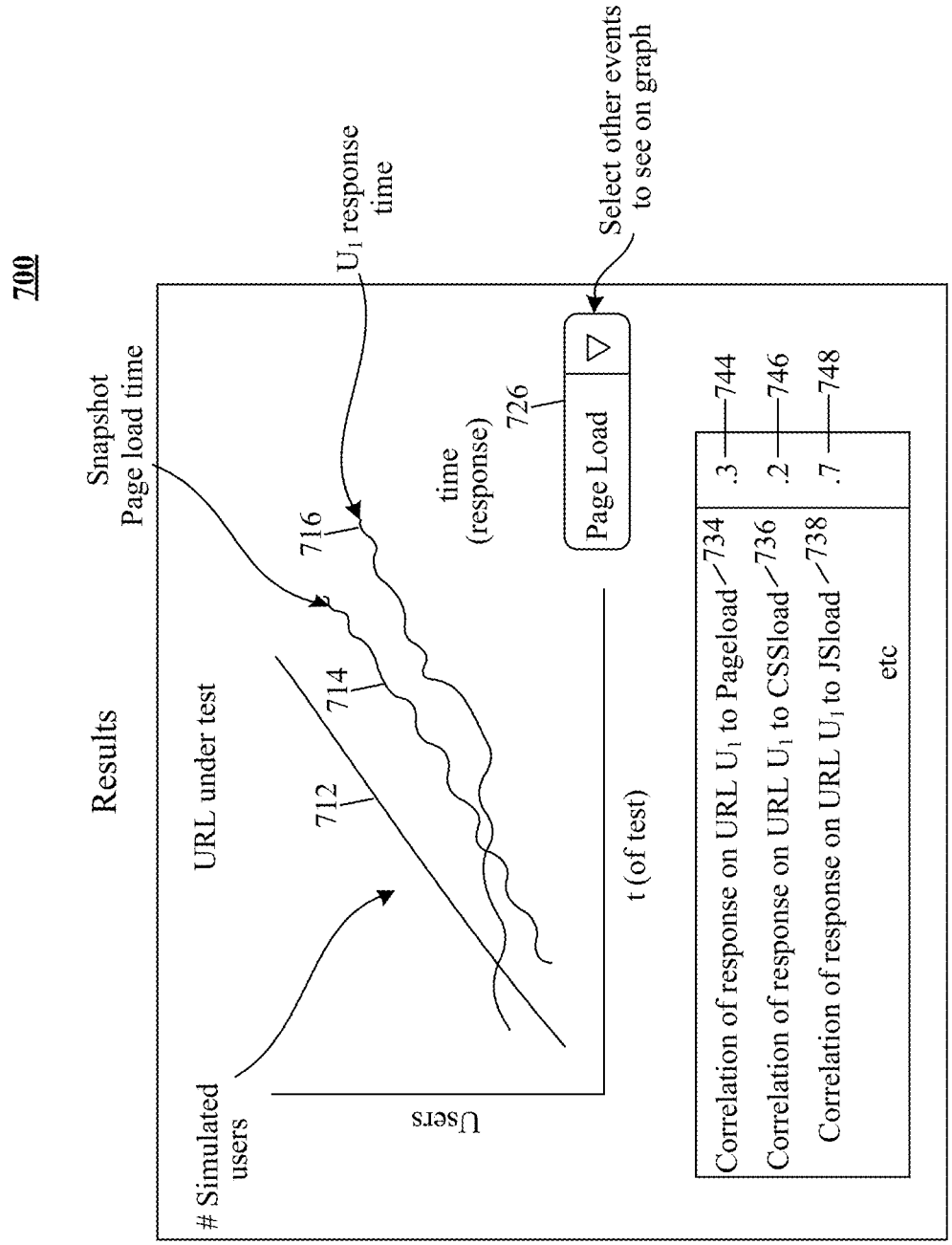
FIG. 7 presents an example of variables available for correlation or co-variance analysis.

The technology disclosed can correlate load, response time and other metrics to reveal causes of bad user experience or other performance issues. Strong correlations also suggest setting alternative alert thresholds based on the correlated metrics. Both cause variables, such as number of concurrent users, resource request load for particular URL, and available system capacity, and result variables, such as response time, hit rate and timeout rate, can be tested for co-variance. FIG. 7 presents an example of variables available for correlation or co-variance analysis. In the example 700, the simulated number of users 712 requesting a particular URL (or sequence of URLs) increase during the test. The increasing request load impacts both page load time 714 measured in performance snapshots, and U1 response time 716 in the performance test. A plurality of metrics is available for review is accessible from drop down menu 726. In addition to graphs, Pearson product-moment correlations are shown that relate U1 response time 716 to page loading 734, CSS class loading 736, and JavaScript class loading 738, with correlation scores 744, 746, 748. In this analysis, the JavaScript loading time 738 is mostly highly correlated with the URL response time 716 with a value of 0.7 (748). This suggests that the performance of JavaScript loading might be a good indicator of overall response time. In the long term, diagnostically, this could mean that the size of the JavaScript load should be reduced or the cache time for saving JavaScript code extended, either in memcache devices or locally in the browser. Pending improved system design, the strong correlation suggests setting an alert threshold based on JavaScript load time.

Figure 8:
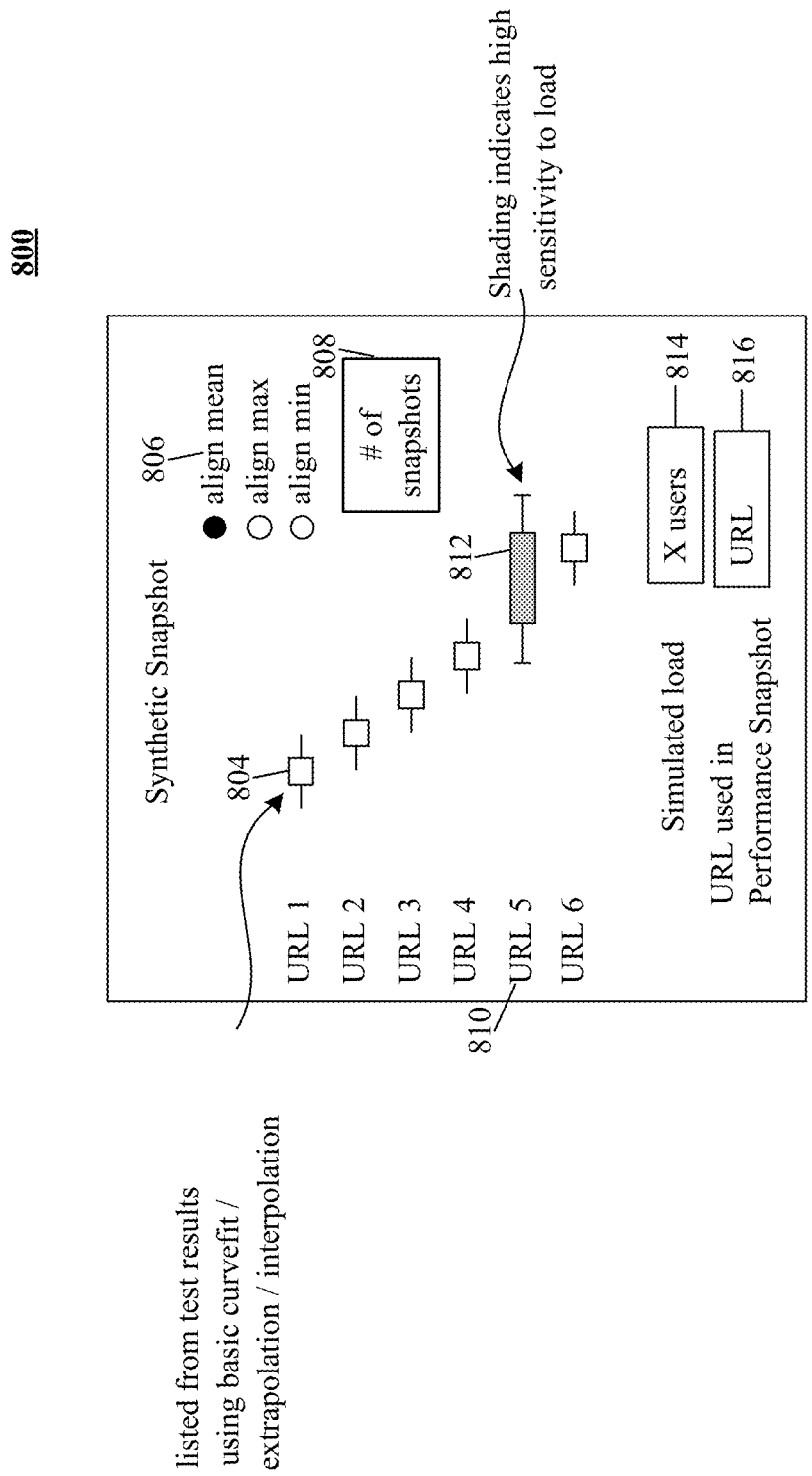
FIG. 8 illustrates an example a box-and-whisker plot report for response times for six particular URLs during a resource request loading test.

FIG. 8 illustrates an example a box-and-whisker plot report for response times for six particular URLs during a resource request loading test. The report shows a range of resource loading times for resources identified by URL1 to URL6. Completion of loading is delayed as the test progresses and the test load grows. Sensitivity to the test load is indicated by the length of boxes and whiskers 804, 812. These box-and-whisker plots depict ranges and quartiles of completion times, illustrating skew and dispersion. The ends of each "whisker" on each end of the box represent values for the minimum and maximum datum. The first quartile is defined as the middle number between the smallest number and the median of the data set. It corresponds to the interval from the left whisker to the left edge of the box. The second quartile is the median of the data. The third quartile is the middle value between the median and the highest value of the data set, corresponding to the left whisker to the right edge of the box. The maximum time is from left to right whisker. A similar whisker plot could depict resource loading completion times, instead of durations.

The chart 800 can cascade the box-and-whisker plots with various alignments between rows. For instance with the mean, minimum, and maximum values 806 obtained for during tests could be used to align the start of loading a dependent URL with the completion of loading the URL that precedes it. In this example, the radio button "align mean" is selected. Suppose URL2 is listed in URL1 and the test does not begin loading URL2 until it completes loading URL1. Selection of "align mean" causes a visualization engine to align the start of loading URL2 with the median completion of loading URL1. The start of each box-and-whisker object on the screen is aligned to the mean value of a URL in which it was depended, which called for it to be loaded. The overall median or mean duration of time to completion of loading URL6 is at the median or mean point in the URL6 box-and-whisker row. In response to "align max" or "align min", the visualization engine would align the box-and-whisker objects by the maximum or minimum completions of prior URLs, respectively, essentially depicting the minimum or maximum overall completion time.

In one implementation, variability of duration due to load, represented by the length of the box-and-whisker objects starting with URL 1 804, can be curve fit to highlight sensitivity to load for values not tested. As with stock portfolio performance, curves can be fit to minimum, median, maximum or other values within the box-and-whisker objects. The curve fit will not reveal specific events within the data, but will allow drilling down into the data for research. Similarly, in FIG. 8, URL 5 810 can be color coded or otherwise marked, to reveal that it is most impacted among the 6 URLs by load variation. The box-and-whisker object 812 shows the greatest variation in time required to load URL5 (810) as the test load increased.

Figure 9:
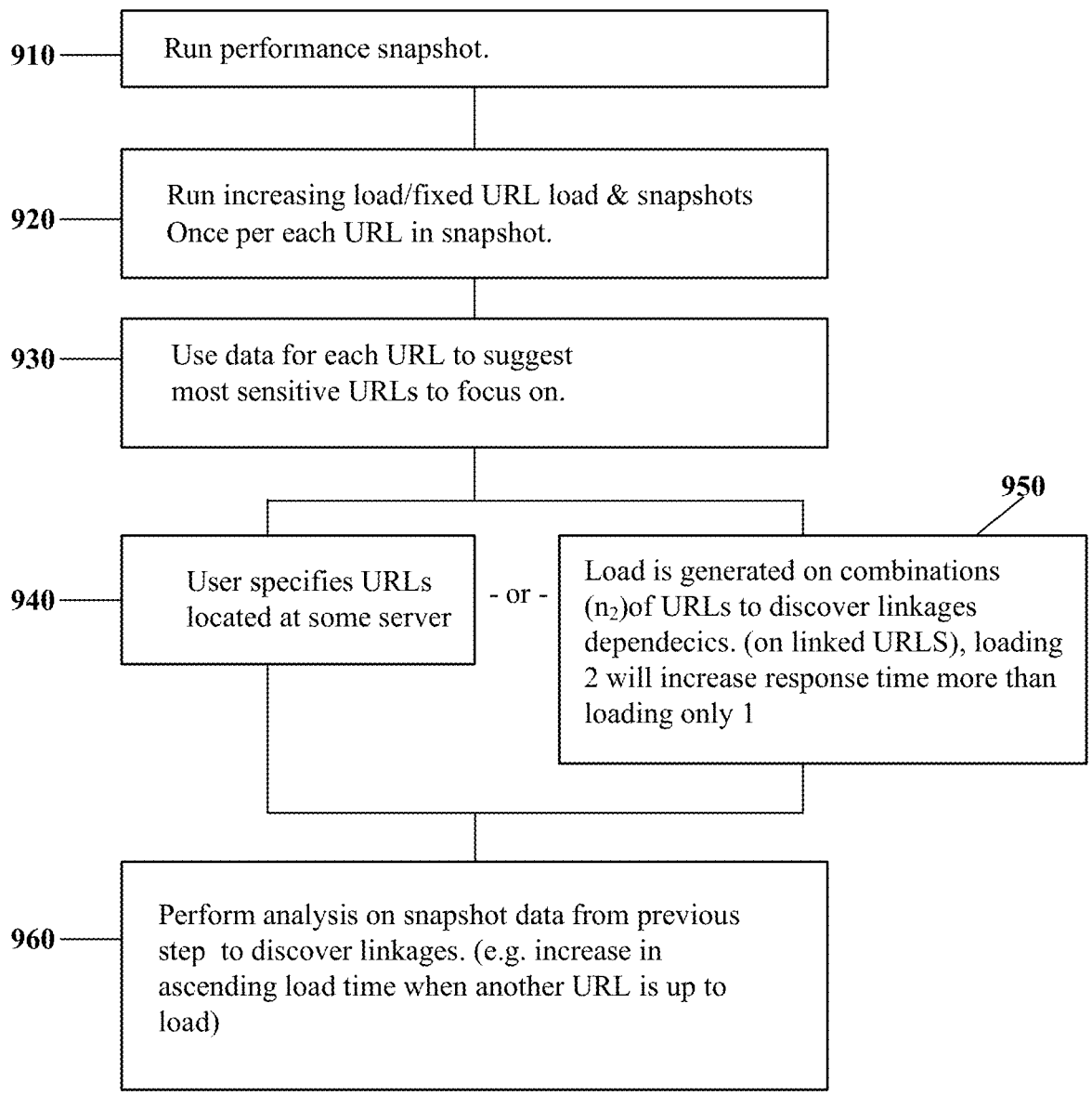
FIG. 9 is a high-level flow chart of an example test and correlation analysis sequence.

FIG. 9 is a high level flow chart of an example test and correlation analysis sequence. A performance snapshot 910 is run on the target site to identify the constituent URLs. The URLs to be test loaded are selected, and a performance test with increasing load is performed on each chosen URL 920. Repeated performance snapshots are collected during test segments. The analysis described, such as the synthetic snapshot 802, is used to identify the URLs (e.g., 812) most sensitive to load testing 930 as the performance test iterates through the URLs 816. The test operator can then identify specific URLs to be used in the correlation analysis 940, or can allow the technology disclosed to generate a combination of URLs to use as pairs in the analysis 950. For example, if there are 6 URLs of interest, then the number of pairwise test permutations follows from the familiar expression "n choose k":

$$\binom{n}{k} = \frac{n!}{k!(n-k)!}$$

where 'n' is the number of URLs in the set (6 URLs) and 'k' is the number URLs in the subset (2), would result in 15 pairs of test resource loading combinations. The impact of simulated stress test loading of these resource pairs, measured by emulating page or app loading, can be compared to impacts of simulated stress test loading of the 6 individual URLs. Comparing pairwise to single resource stress loading reveals interaction between URLs, such as shared back end resources with limited capacity. Correlation analysis can automatically highlight the strength of interactions 960. The technology disclosed supports any number of URLs ('n'), and any number of URLs in a subset ('k'). The combinations of tests possible would be an extension of the values for 'n' and 'k'.

Figure 10:
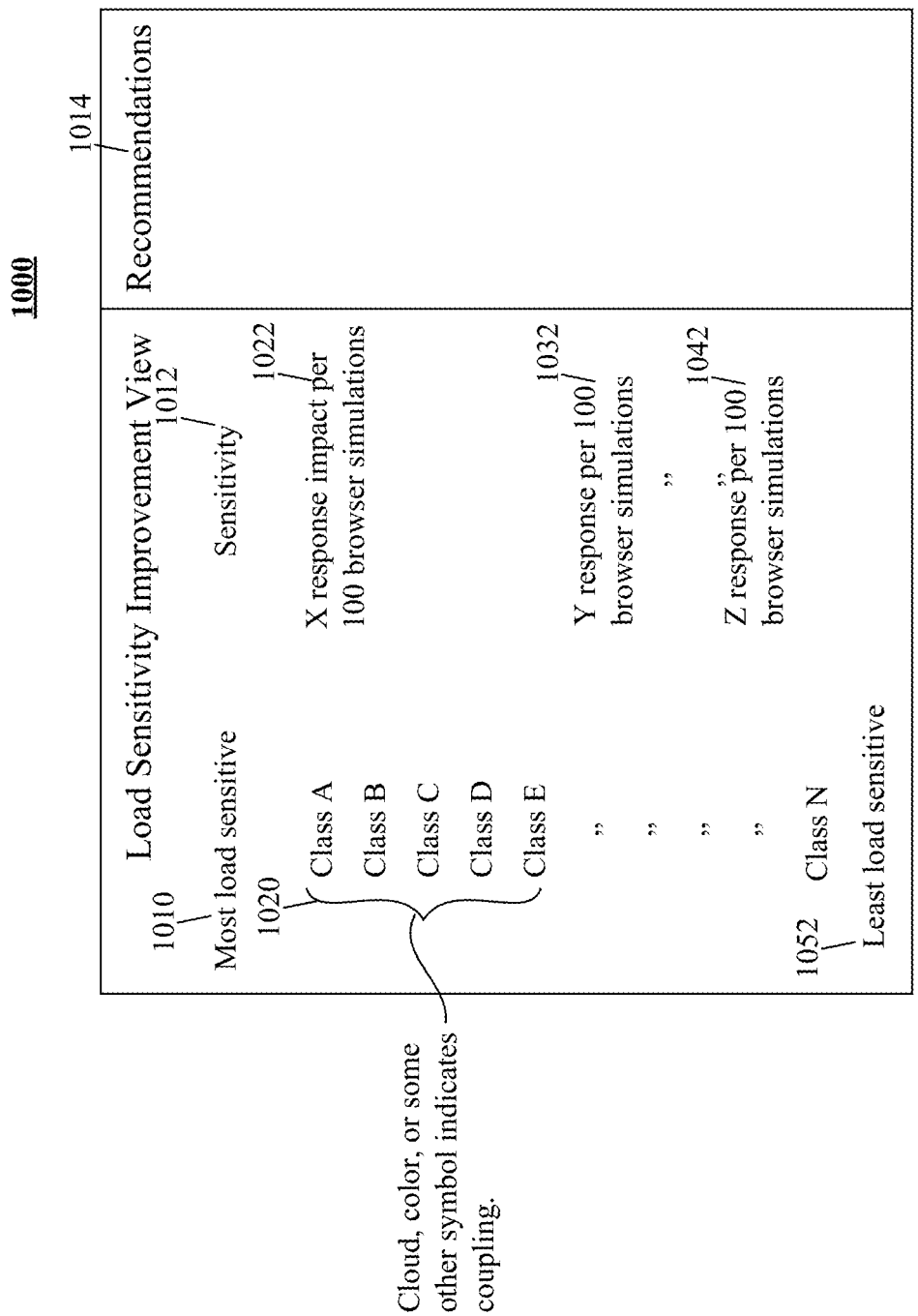
FIG. 10 illustrates an example of analyzing asset sensitivity by class.

FIG. 10 illustrates an example of analyzing asset sensitivity by class. URLs can also be grouped into classes and load sensitivity analysis performed by class. For example, all of the jpeg assets can be grouped together into a jpeg class, all of the CSS assets can be grouped into a CSS class, and so on. Most classes contain a plurality of assets and can contain a plurality of asset types. For each asset class, any of the analyses described above can be calculated. In this illustration, asset classes are sorted from most sensitive 1010 to test loads to least sensitive 1052. A group of asset classes 1020 can be designated by different colors, different fonts, or other visible attribute. In this example, the measure of sensitivity 1012 is the amount of performance degradation per 100 added simulated users. A curve fit can be expressed by a polynomial, such as a first degree polynomial 1022 or a higher degree polynomial 1032, 1042. Sparklines or similar graphical representations of the curve fits can accompany or substitute for polynomial coefficients. Recommendations for improvement can also be determined from the analysis and presented for review 1014.

Figure 11:
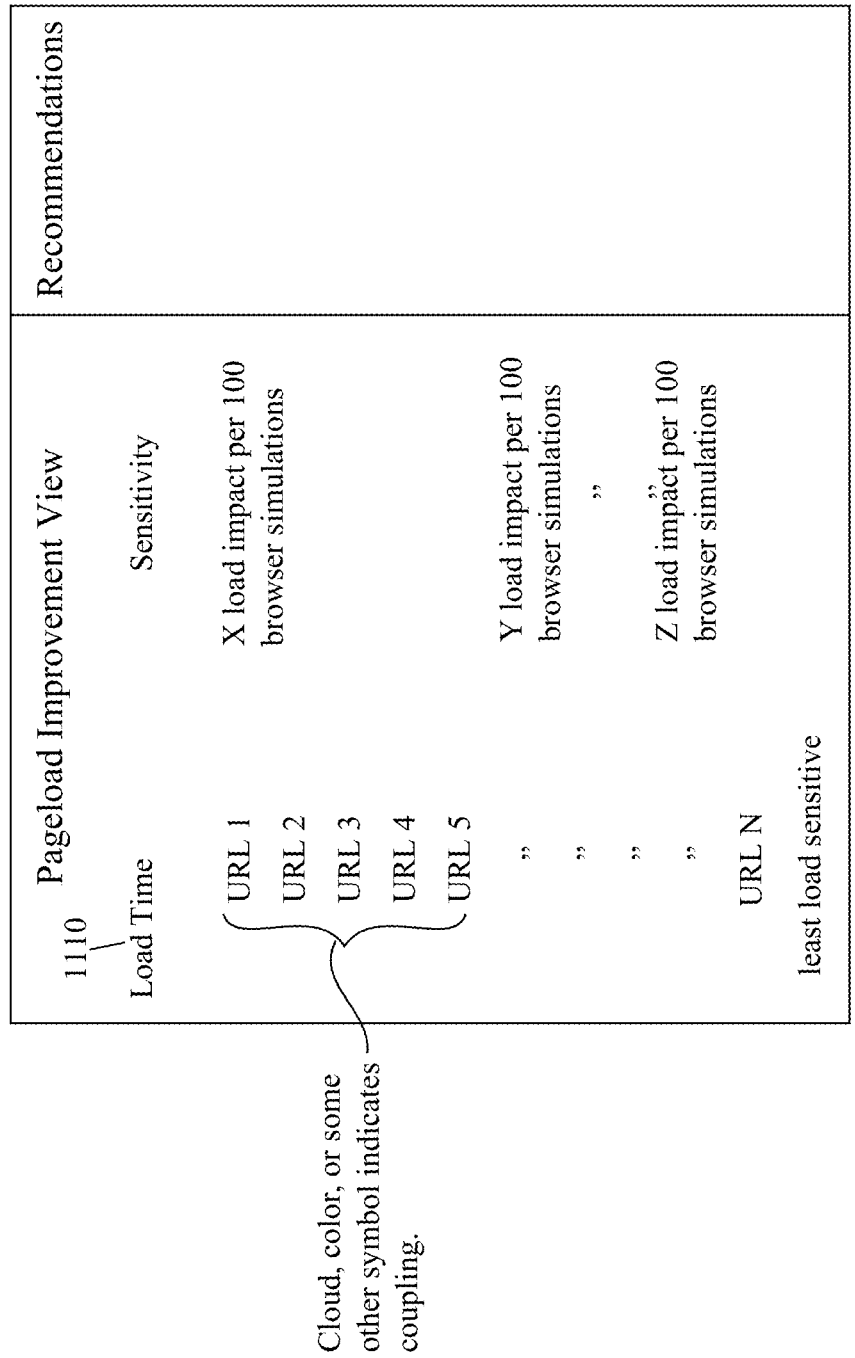
FIG. 11 shows a rank ordering of page load time sensitivity to test loading of various URLs.

The analysis presented in FIG. 10 applied to various performance measures and stimulus. For example, FIG. 11 shows a rank ordering of page load time sensitivity to test loading of various URLs 1010. In this example, the dependent variable is page load time, instead of individual URL loading time.

Figure 12:
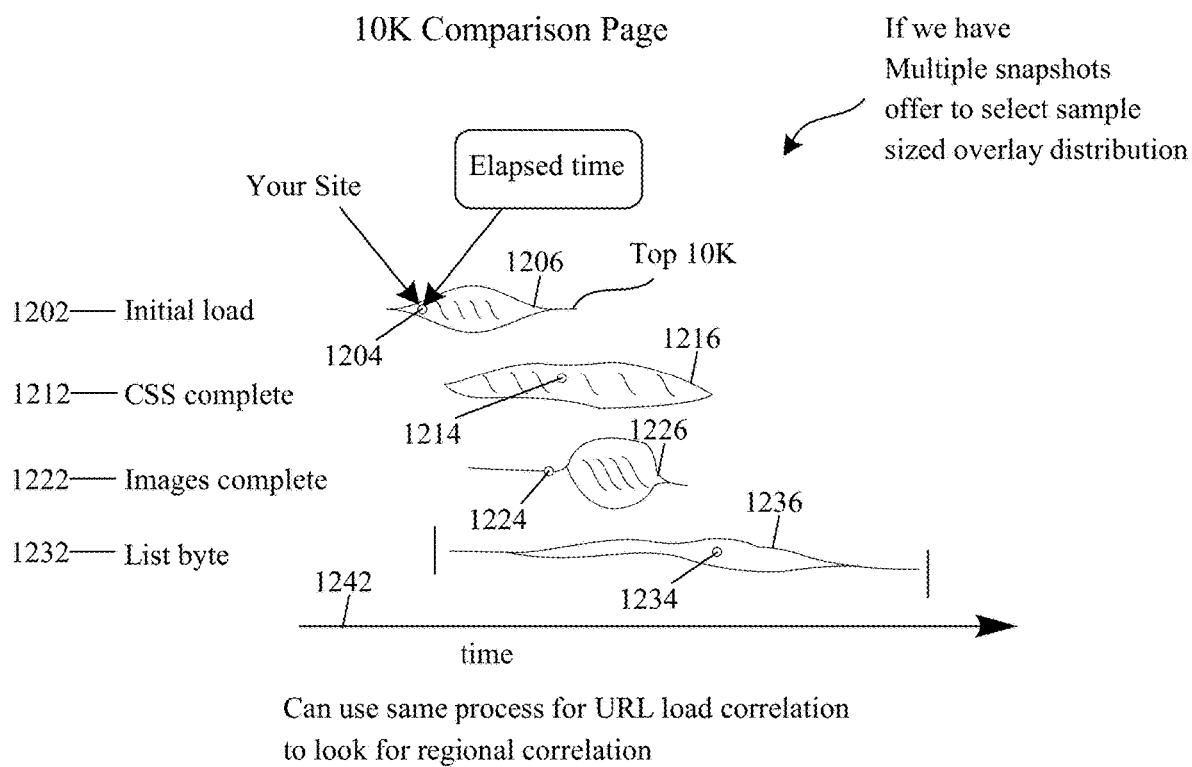
FIG. 12 is an example of a report where 10,000 web pages are compared.

Another application of the technology disclosed is benchmarking large populations of web pages. FIG. 12 is an example of a report where 10,000 web pages are compared. The technology disclosed can be applied to collect performance information from thousands of web pages on an ad hoc or scheduled basis. The web pages can be categorized by page size, number of images, size of HTML, JavaScript or CSS, reliance CDN resource delivery, market segment, etc. The size statistics can be a different part of the analysis than is the temporal analysis.

Analysis of large populations of web sites, whose owners have not requested a stress test, are performed using the performance snapshot technology and natural background loads, without stress loading, as stress test loading would be interpreted by the site owner as a denial of service attack. The web sites selected for profiling can be recognized, web site high traffic volume sites or a group of sites in a market segment.

Examples of performance milestones such as initial load 1202, CSS complete 1212, images complete 1222, and last byte 1232 are shown with distributions of 1206, 1216, 1226, and 1236, respectively, over time 1242. The shape of the distributions 1206, 1216, 1226 indicates the range and centrality of the related variable, or variable class, for all web pages in the same category. In one example, a web site of interest, labelled "Your Site", is shown to have a low initial load time 1204, an average CSS complete time 1214, a very low image complete time 1224, and an average last byte time 1234. This allows the owner of the web page to compare the performance of their site to other sites within their category. In another implementation, the plurality of samples for the web site of interest can be presented in a form such as a box-and-whisker object, and overlaid onto the distributions. In yet another implementation, the URL load correlations can be accomplished by region.

Computer System

Figure 13:
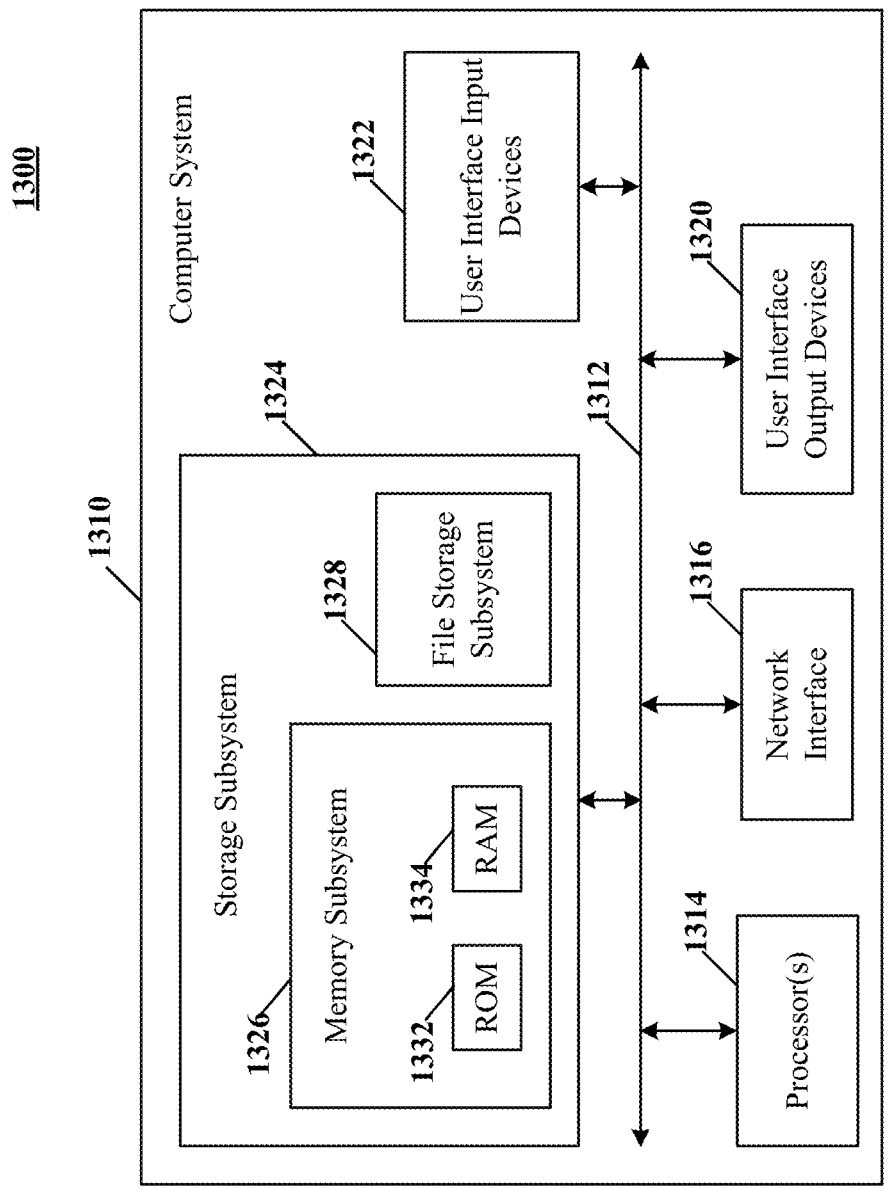
FIG. 13 is an example of a computer system.

FIG. 13 is a block diagram of an example computer system, according to one implementation. Computer system 1310 typically includes at least one processor 1314 that communicates with a number of peripheral devices via bus subsystem 1312. These peripheral devices can include a storage subsystem 1324 including, for example, memory devices and a file storage subsystem, user interface input devices 1322, user interface output devices 1320, and a network interface subsystem 1316. The input and output devices allow user interaction with computer system 1310. Network interface subsystem 1316 provides an interface to outside networks, including an interface to corresponding interface devices in other computer systems.

User interface input devices 1322 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1310.

User interface output devices 1320 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1310 to the user or to another machine or computer system.

Storage subsystem 1324 stores programming and data constructs that provide the functionality of some or all of the modules and methods described herein. These software modules are generally executed by processor 1314 alone or in combination with other processors.

Memory 1326 used in the storage subsystem can include a number of memories including a main random access memory (RAM) 1330 for storage of instructions and data during program execution and a read only memory (ROM) 1332 in which fixed instructions are stored. A file storage subsystem 1328 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1328 in the storage subsystem 1324, or in other machines accessible by the processor.

Bus subsystem 1312 provides a mechanism for letting the various components and subsystems of computer system 1310 communicate with each other as intended. Although bus subsystem 1312 is shown schematically as a single bus, alternative implementations of the bus subsystem can use multiple busses.

Computer system 1310 can be of varying types including a workstation, server, computing cluster, blade server, server farm, or any other data processing system or computing device. Due to the ever-changing nature of computers and networks, the description of computer system 1310 depicted in FIG. 13 is intended only as one example. Many other configurations of computer system 1310 are possible having more or fewer components than the computer system depicted in FIG. 13.

While the technology disclosed is by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

Some Particular Implementations

In one implementation, a method is described of automatically correlates load-dependent results and identifies co-variant load-dependent results, leading to multiple alert thresholds. The method includes identifying and load testing resources invoked by a web app (inclusive of a web application or a web page). The method includes initiating a load test of a subject web app that requests resources from a system under test. For each testable resource in a set of multiple testable resources, this method also includes causing a test load to vary for the testable resource in a test segment, and collecting from the test segments at least one measure of load-dependent results related to expected user experience as the test load varies. The expected user experience is expected in a statistical sense of predicted experience in the future based on the results to tests. In the disclosed method, the set of testable resources is a selected subset of resources, including nested resources, requested by a user device upon invoking the subject web app. This method also correlates the load-dependent results and identifies co-variant load-dependent results, and is responsive to receiving user input selecting a first alert threshold for a first testable resource or for a first load-dependent result. The load-depended results can be differentiated by the web page load, which affect the covariant load-dependent results. The method uses the identified co-variant load-dependent results to suggest or set a second alert threshold for a second load-dependent result, and persists the first alert threshold and the second alert threshold to be applied by a monitoring device.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations impacting details of test implementation and analysis and of setting thresholds based on test results.

The method can be combined with first and second alert thresholds defining representative intervention points where measured conditions are expected to impact or begin impacting the expected user experience from invoking the subject web app. The method also includes conducting a hybrid test using a simulated user load generator to request the testable resources and an emulated browser to invoke the web app and measure response time of invoking components of the web app as the measure of load-dependent results.

The method can also include conducting a hybrid test using a plurality of simulated user load generators to request the testable resources from distinct and separated locations and a plurality of emulated browsers at distinct and separated locations to invoke the web app and measure response time of invoking components of the web app as the measure of load-dependent results. This can include having at least some of the simulated user load generators and emulated browsers run on virtual machines using resources of a hosted cloud service provider.

In one implementation, the method can be extended to transmit for display at least one performance graph of the varying load for the testable resource and the dependent performance measure, wherein the display includes a control for user selection of one or more points from the performance graph as the first alert rule. It can also receive data representing user selection of the first alert rule. Prior to the selection of the first alert rule, analysis of the dependent results to identify a knee or elbow in a trend line representing the dependent results and transmitting to a user a suggested first alert rule based on a load level relative to the knee or elbow in the trend line.

The method can include receiving user input that indicates that two or more testable resources are causally interrelated and confirming the indicated causal relationship based on the correlated testable resources or the correlated dependent results. It can further include receiving user input that indicates that two or more testable resources are causally interrelated and rejecting received the indicated causal relationship based on the correlated testable resources or the correlated dependent results.

In another implementation, the causal interrelationship is indicated to be that the two or more testable resources are compiled by a common database server. This causal interrelationship can also indicate that the two or more testable resources are served by a common content delivery network.

The method can further include at least one of the first alert rule or the second alert rule that specifies a threshold and that it be triggered when a load for the testable resource or for the dependent performance measure reaches or crosses the threshold.

In another implementation, a method of identifying and load testing resources critical to invoking a web app includes parsing a subject web app to identify resources. This includes nested resources loaded upon invoking the subject web app. This method also includes conducting a hybrid load test of a selected plurality of the identified resources including load testing response to requests for particular resources among the identified resources. The load testing simulates a multiplicity of user sessions requesting the particular resources and a number of the user sessions vary during the load testing. The experience testing load time of at least components of the subject web app during the load testing, wherein the experience testing emulates a browser, requests the subject web app, requests the identified resources and nested resources, and records at least response times for loading the identified resources and nested resources. The method also identifies from the load testing and experience testing some of the particular resources as more sensitive than others to how many user sessions request the particular resource, generating data for display that includes the identified more sensitive particular resources.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations impacting details of test design and implementation.

The method can be combined with iterating through the selected identified resources and load testing requests for individual particular resources while experience testing the subject web app. And it can include: iterating through the selected identified resources; load testing requests for the pairs particular resources while experience testing the subject web app; and correlating the pairs of particular resources using results of the experience testing.

In another implementation, the method includes the receiving of at least one grouping of the identified resources as being loaded from a common server, and load testing requests for the particular resources from the common server while experience testing the subject web app. And it includes varying a number of the simulated user sessions through a predetermined range. Varying a number of simulated user sessions to produce a predetermined load time of the subject web app is also supported by the method. And the component response times can be divided into at least an initial response time and a component load time.

Other implementations may include a non-transitory computer readable storage medium storing instructions executable by a processor to perform any of the methods described above. A non-transitory computer readable storage medium is other than a transitory medium such as an electromagnetic wave. Yet another implementation may include a system including memory and one or more processors operable to execute instructions, stored in the memory, to perform any of the methods described above.

While the present technology is disclosed by reference to the preferred implementations and examples detailed above,

What I claim is:

1. A method of identifying and load testing resources invoked by a web app (inclusive of a web application or a web page), the method including:
    initiating a load test of a subject web app that requests resources from a system under test, including,
        for each testable resource in a set of multiple testable resources that are objects on a web page or objects provided by a back end system, causing a test load to vary for the testable resource in a test segment, and
        collecting from the test segment at least one measure of load-dependent results related to expected user experience as the test load varies;
    correlating the load-dependent results and identifying co-variant load-dependent results;
    using the identified co-variant load-dependent results to suggest or set an alert threshold for a load-dependent result; and
    storing the alert threshold to be applied by a monitoring device monitoring the subject web app and sending alerts to an operator via visual or non-visual display when the alert threshold is met.

2. The method of claim 1, wherein the threshold represents an intervention point when measured conditions are expected to impact or begin impacting the expected user experience from invoking the subject web app.

3. The method of claim 1, further including conducting a hybrid test using a simulated user load generator to request the testable resources and an emulated browser to invoke the web app and measure response time of invoking components of the web app as the measure of load-dependent results.

4. The method of claim 1, further including conducting a hybrid test using a plurality of simulated user load generators to request the testable resources from distinct and separated locations and a plurality of emulated browsers at distinct and separated locations to invoke the web app and measure response time of invoking components of the web app as the measure of load-dependent results.

5. The method of claim 4, wherein at least some of the simulated user load generators and emulated browsers run on virtual machines using resources of a hosted cloud service provider.

6. The method of claim 1, further including:
    transmitting for display at least one performance graph of the varying load for the testable resource and a dependent performance measure, wherein the display includes a control for user selection of one or more points from the performance graph as an alert rule; and
    receiving data representing user selection of the alert rule.

7. The method of claim 1, further including, prior to the selection of a first alert rule, analyzing the dependent results to identify a knee or elbow in a trend line representing the dependent results and transmitting to a user a suggested first alert rule based on a load level relative to the knee or elbow in the trend line.

8. The method of claim 1, further including receiving user input that indicates that two or more testable resources are causally interrelated and confirming the indicated causal relationship based on the correlated testable resources or the correlated dependent results.

9. A method of hybrid load testing a selected plurality of identified resources that are objects on a web page or objects provided by a back end system, the method including:
    conducting a hybrid load test of a plurality of the identified resources, including:
        load testing by simulating a multiplicity of user sessions requesting particular resource objects; and
        experience testing load time of at least components of a subject web app during the load testing, wherein the experience testing emulates a browser, and records at least response times for loading the identified resources and nested resource objects;
    identifying from the load testing and experience testing some of the particular resource objects as more sensitive than others; and
    generating data for display that includes the identified more sensitive particular resource objects.

10. The method of claim 9, further including iterating through the selected identified resources and load testing requests for individual particular resource objects while experience testing the subject web app.

11. The method of claim 9, further including:
    iterating through the selected identified resources;
    load testing requests for pairs particular resource objects while experience testing the subject web app; and
    correlating the pairs of particular resource objects using results of the experience testing.

12. The method of claim 9, further including:
    receiving at least one grouping of the selected identified resources as being loaded from a common server; and
    load testing requests for the grouping of resources from the common server while experience testing the subject web app.

13. The method of claim 9, further including varying a number of simulated user sessions through a predetermined range.

14. The method of claim 9, further including varying a number of the simulated user sessions to produce a predetermined load time of the subject web app.

15. The method of claim 9, wherein component response times are divided into at least an initial response time and a component load time.

16. At least one device, including a processor, a network interface, and memory storing computer instructions that, when executed on the processor, cause the device to perform a method of identifying and load testing resources invoked by a web app (inclusive of a web application or a web page), the method including:
    initiating a load test of a subject web app that requests resources from a system under test, including,
        for each testable resource in a set of multiple testable resources that are objects on a web page or objects provided by a back end system, causing a test load to vary for the testable resource in a test segment, and
        collecting from the test segment at least one measure of load-dependent results related to expected user experience as the test load varies;
    correlating the load-dependent results and identifying co-variant load-dependent results;
    using the identified co-variant load-dependent results to suggest or set an alert threshold for a load-dependent result; and
    storing the alert threshold to be applied by a monitoring device monitoring the web app and sending alerts to an operator via visual or non-visual display when the alert threshold is met.

17. The device of claim 16, wherein the threshold represents an intervention point when measured conditions are expected to impact or begin impacting the expected user experience from invoking the subject web app.

18. A non-transitory computer readable medium storing instructions that, when executed on a processor device, cause the device to perform a method of hybrid load testing a selected plurality of identified resources that are objects on a web page or objects provided by a back end system, the method including:
- conducting a hybrid load test of a plurality of the identified resources, including:
  - load testing by simulating a multiplicity of user sessions requesting particular resource objects; and
  - experience testing load time of at least components of a subject web app during the load testing, wherein the experience testing emulates a browser, and records at least response times for loading the identified resources and nested resource objects;
- identifying from the load testing and experience testing some of the particular resource objects as more sensitive than others; and
- generating data for display that includes the identified more sensitive particular resource objects.

19. The non-transitory computer readable medium of claim 18, further causing execution of the method including iterating through the selected identified resources and load testing requests for individual particular resource objects while experience testing the subject web app.

20. The device of claim 18, further causing execution of the method including:
- iterating through the selected identified resources;
- load testing requests for pairs particular resource objects while experience testing the subject web app; and
- correlating the pairs of particular resource objects using results of the experience testing.

* * * * *